United States Patent
Stuntebeck

(10) Patent No.: US 9,298,936 B2
(45) Date of Patent: Mar. 29, 2016

(54) ISSUING SECURITY COMMANDS TO A CLIENT DEVICE

(71) Applicant: AirWatch, LLC, Atlanta, GA (US)

(72) Inventor: Erich Stuntebeck, Atlanta, GA (US)

(73) Assignee: AirWatch LLC, Atlanta, GA (US)

(*) Notice: Subject to any disclaimer, the term of this patent is extended or adjusted under 35 U.S.C. 154(b) by 0 days.

(21) Appl. No.: 14/314,610

(22) Filed: Jun. 25, 2014

(65) Prior Publication Data

US 2015/0379284 A1    Dec. 31, 2015

(51) Int. Cl.
| | |
|---|---|
| G06F 21/10 | (2013.01) |
| G06F 21/62 | (2013.01) |
| H04L 29/06 | (2006.01) |
| H04L 12/58 | (2006.01) |

(52) U.S. Cl.
CPC .............. G06F 21/62 (2013.01); H04L 51/18 (2013.01); H04L 67/42 (2013.01)

(58) Field of Classification Search
CPC ....................................................... G06F 21/10
See application file for complete search history.

(56) References Cited

U.S. PATENT DOCUMENTS

| | | | | |
|---|---|---|---|---|
| 8,572,676 | B2* | 10/2013 | Sapp et al. .................... | 726/1 |
| 2013/0007245 | A1* | 1/2013 | Malik et al. .................. | 709/223 |
| 2014/0006347 | A1 | 1/2014 | Qureshi et al. | |
| 2014/0007183 | A1* | 1/2014 | Qureshi et al. ............... | 726/1 |
| 2014/0109171 | A1 | 4/2014 | Barton et al. | |
| 2014/0165213 | A1 | 6/2014 | Stuntebeck | |
| 2014/0173733 | A1* | 6/2014 | Ford .............................. | 726/23 |

OTHER PUBLICATIONS

International Search Report mailed Sep. 11, 2015 for PCT/US2015/036993.

* cited by examiner

*Primary Examiner* — Kambiz Zand
*Assistant Examiner* — Thanh Le
(74) *Attorney, Agent, or Firm* — Thomas | Horstemeyer, LLP

(57) ABSTRACT

Disclosed are various embodiments for issuing security commands, such as a wipe command, to a client device. An application executed by the client device can include a mail proxy that can act as a proxy to a remote mail server and determine compliance with compliance rules. Should the client device violate a compliance rule, the mail proxy executed by the client device may issue a security command to a mail client executed by the client device.

24 Claims, 6 Drawing Sheets

ISSUING SECURITY COMMANDS TO A CLIENT DEVICE

BACKGROUND

Controlling access to enterprise resources, such as electronic mail, calendar data, contacts, or other applications and data, by network-connected devices may be employed in an enterprise environment to ensure that only authenticated and authorized users, applications, and devices gain access to sensitive information and/or services. Network administrators, via a mail server or other type of remote server, can issue a command instructing the client device, often via a mail client executed by the client device, to erase or remove data stored on the client device. In other words, a remote mail server may issue a wipe command to the client device in various scenarios.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
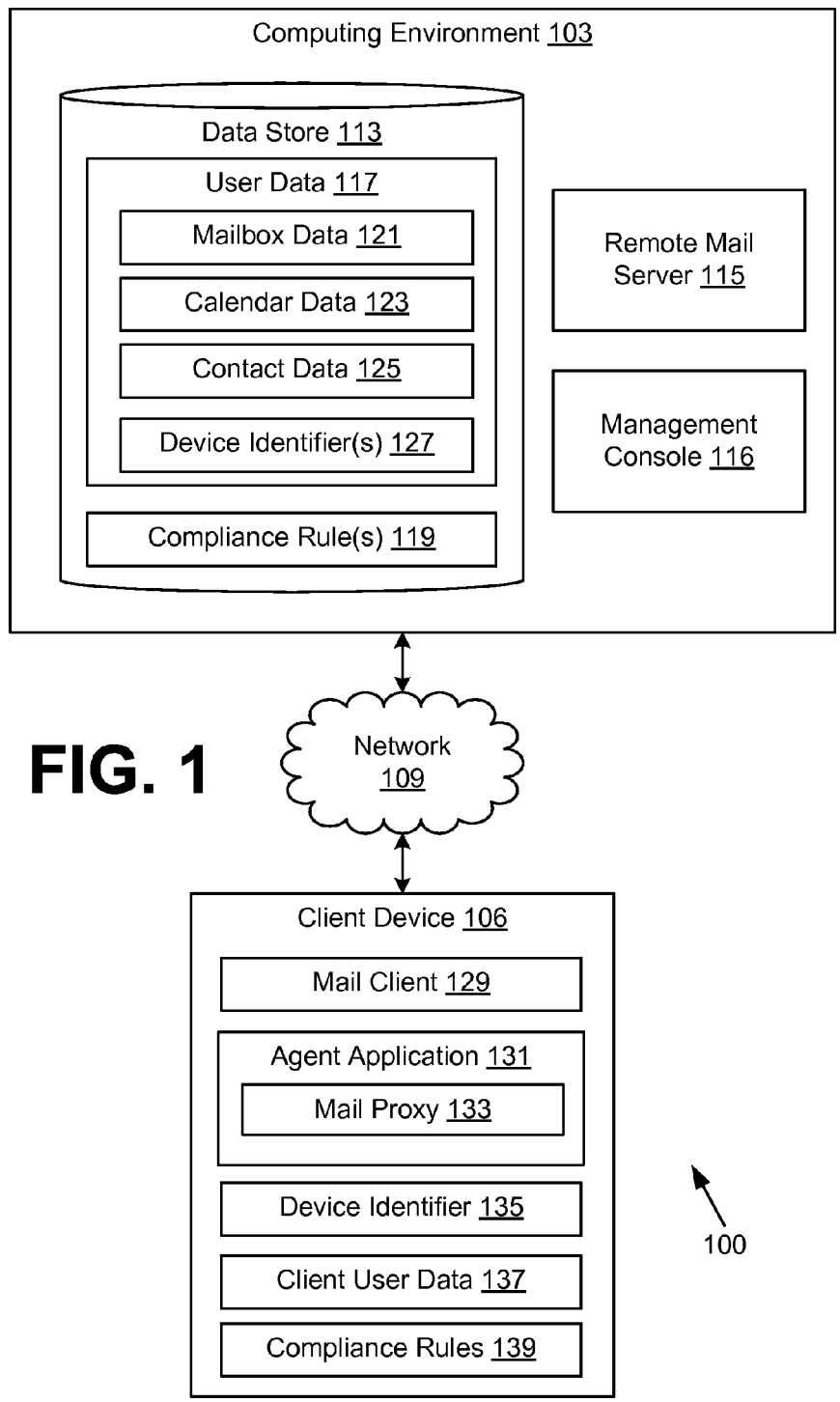
FIG. 1 is a drawing of a networked environment according to various embodiments of the present disclosure.

Users in an enterprise environment can be provided with access to electronic mail via a mobile device, personal computer and/or other type of computing device or client device. Systems administrators may wish to impose certain restrictions, limitations and/or policies on users who may be accessing resources such as electronic mail, calendar data, contacts, or other resources such as documents, shared folders, etc., for which secure access is desired. Users may sometimes install unapproved applications or attempt to bypass or overcome restrictions or limitations that are imposed on a device's hardware or software. Accordingly, a system administrator may desire to determine whether a user has bypassed or overcome a restriction or limitation imposed on a device's hardware or software and remove the user's access to corporate resources such as email, calendar, contacts and/or corporate documents or applications.

As one example, a computing device, such as a mobile device, may be obtained by a user for which root access or "superuser" privileges are unavailable to the user or a user account of the user. Such a limitation can be imposed by the device manufacturer and/or seller in order to reduce the possibility of the user installing applications that are unapproved by an administrator, the user's employer or issuer of the device, a carrier, device manufacturer, operator of an application marketplace or other entity. Such a limitation can also be imposed to reduce the likelihood of the user installing malicious software that has not been evaluated for maliciousness by such an entity. Embodiments of the disclosure can determine whether a limitation such as this or other possible limitations or restrictions have been removed, bypassed or overcome by the user. If such a case can be detected, embodiments of the disclosure can disable the user's access to corporate resources such as email, calendar data, contacts or other corporate resources or documents.

Embodiments of the disclosure operate by executing a mail proxy locally on a client device. A mail client executed by the client device is configured to communicate with the mail proxy to access email, calendar data, contacts, etc., as opposed to a remote mail server that is external to the client device and through which access to enterprise data and/or resources is facilitated. In other words, the mail client executed by the client device is configured to identify a network address corresponding to the locally executed mail proxy as the mail server corresponding to a particular mail account. The locally executed mail proxy can proxy requests to and from the mail client and to and from the remote mail server for access to the enterprise data and/or resources.

The locally executed mail proxy, or another process executed in conjunction with the mail proxy, can determine whether the client device complies with various compliance rules upon receiving a communication from the mail client. In some embodiments, the mail proxy and/or another application executed by the client device can consult a network accessible service that determines whether the client device complies with various compliance rules. Additionally, the mail proxy and/or another application executed by the client device may determine compliance with compliance rules by consulting a combination of a locally executed process and a remotely executed application.

If the client device fails to comply with one or more compliance rules, a mail proxy executed by the client device can issue a security command as determined by the compliance rule with which the client device fails to comply. For example, such a compliance rule can specify that should the operating system of client device be modified in a certain way, the mail proxy should issue a wipe command to the mail client instructing the mail client to remove locally stored mail, calendar and/or contact data. In this way, even if network accessibility of the client device is removed or impaired by a user, a compliance rule can still be enforced by the locally executed mail proxy. In the following discussion, a general description of the system and its components is provided, followed by a discussion of the operation of the same.

With reference to FIG. 1, shown is a networked environment 100 according to various embodiments. The networked environment 100 includes a computing environment 103 and a client device 106, which are in data communication with each other via a network 109. The network 109 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks.

The computing environment 103 may comprise, for example, a server computer or any other system providing computing capability. Alternatively, the computing environment 103 may employ a plurality of computing devices that may be arranged, for example, in one or more server banks, computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time. The computing environment 103 may also include or correspond to one or more virtualized server instances that are created in order to execute the functionality that is described herein.

Various applications and/or other functionality may be executed in the computing environment 103 according to various embodiments. Also, various data is stored in a data store 113 that is accessible to the computing environment 103. The data store 113 may be representative of a plurality of data stores 113 as can be appreciated. The data stored in the data store 113, for example, is associated with the operation of the various applications and/or functional entities described below.

The components executed on the computing environment 103, for example, include a remote mail server 115, a management console 116, and other applications, services, processes, systems, engines, or functionality not discussed in detail herein. The remote mail server 115 is executed to provide mail server functionality and may comprise multiple mail servers executed by a computing environment 103 to provide access to enterprise data on behalf of a large user base. The remote mail server 115 can facilitate remote access to email, calendar information, contacts or other resources on behalf of a user. The remote mail server 115 can facilitate download and/or synchronization of email, calendar information, contacts and/or tasks that are stored in a user's mailbox. In some embodiments, the remote mail server 115 can implement a mail synchronization standard or specification, such as MICROSOFT ACTIVESYNC, that facilitates synchronization of a user's data with a client device 106 assigned to the user. The remote mail server 115 can also send and receive email messages, calendar appointment requests and other messages on behalf of a user to other mail servers that are accessible to the remote mail server 115 via a network connection.

The management console 116 is executed to facilitate administration and/or management of client devices 106 that are associated with users accessing enterprise resources, such as mailbox data 121, calendar data 123 and/or contact data 125. In some embodiments, the management console 116 can provide a user interface accessible by an administrator through which the administrator may enroll, activate, remove, deactivate, or otherwise manage devices that are employed to access resources via the remote mail server 115 and/or any other application or service provided by the computing environment 103. In some embodiments, the management console 116 may also determine compliance of client devices 106 associated with a particular user with compliance rules 119 in response to a request received from an application executed by a client device 106. The management console 116 can issue a response to such a request indicating whether the client device 106, or a user account that corresponds to the client device 106, is in compliance with one or more compliance rules 119.

The data stored in the data store 113 includes, for example, user data 117, compliance rules 119, and potentially other data. The user data 117 can include data associated with a user account, such as mailbox data 121, calendar data 123, contact data 125 and device identifiers 127. Mailbox data 121 includes data associated with one or more mailboxes corresponding to a user account of a user. The mailbox data 121 can include electronic mail messages, mail folders into which messages are organized, filtering rules that are applied to incoming and/or outgoing mail messages, attachments associated with mail messages, and/or other data associated with a mailbox of a user. User data 117 can also include access settings, such as authentication credentials, delegation settings (e.g., information about other users who may be provided access to the user data 117 of a particular user), mail and document retention rules and/or policies, and/or other geographic access restrictions or limitations (e.g., information about certain locations and/or networks from which user data 117 can be accessed). User data 117 can also include other account settings, such as biographical or demographic information about a user, password reset information, multi-factor authentication settings, and other data related to a user account as can be appreciated.

Calendar data 123 includes, for example, calendar information such as appointments, reminders, tasks and/or other data that can be associated with a timestamp or date stamp. Calendar data 123 can include appointments that are associated with a particular location and/or user. For example, an appointment can be linked with a particular location, meeting room, building, address or other location. An appointment can also be linked with another user who is internal or external to an organization or domain of the user as well as with text and/or attachments. Calendar data 123 can also include tasks, reminders, or other types of data that can be associated with a time and/or place and placed on a calendar.

Contact data 125 can include personal information manager (PIM) or address book data related to contacts of a particular user such as internal or external email addresses, telephone contact information, mailing addresses, contact notes, and other information associated with contacts that a user may wish to maintain in an address book or contacts store. Contact data 125 can also include user specific address book data as well as global address book data for address books that are shared among multiple users in a domain and/or enterprise. It should be appreciated that a client device 106 of a user may also be synchronized with various other forms of data other than mailbox data 121, calendar data 123 and/or contact data 125 and that the depicted example is shown merely for illustrative purposes.

For example, a client device 106 of a user may also be synchronized or provided access to documents, media or other types of files that are stored in a data store 113 via a remote mail server 115 or other type of synchronization application in accordance with various embodiments of the present disclosure. The client device 106 can be configured to access such resources that are stored in or on the client device 106, in a data store 113 or any other location via any type of application that is executed by the client device 106, and the depicted example of a mail client 129 being configured to access mailbox data 121, calendar data 123 and/or contact data 125 is but one example.

Device identifiers 127 uniquely identify a particular client device 106 that is associated with a user account of a particular user with which data such as mailbox data 121, calendar data 123, contact data 125 and/or other data are synchronized. A particular user account may be synchronized with the device identifiers 127 of multiple client devices 106. In this way, a particular device may be added or removed from a user's account. Compliance rules 119 can be stored on the data store 113 and/or on the client device 106 and represent requirements with which a user and/or a client device 106 must comply in order to access user data 117 via the remote mail server 115.

For example, a compliance rule 119 can specify that a client device 106, in order to access user data 117, must execute a particular version of a mail client. As another example, a compliance rule 119 may specify that in order to access user data 117, a client device 106 must do so from within a particular geographic location and/or via a particular network. A compliance rule 119 may also specify certain time windows during a particular day, week, month or year during which a client device 106 is authorized to access user data 117.

Another example of a compliance rule 119 may comprise a requirement that an operating system of the client device 106 be unmodified with respect to root access or superuser privileges available to the user. For example, certain mobile devices and/or mobile devices may be shipped with restrictions or limitations regarding root access or superuser privileges. In other words, such access may be unavailable to the user. However, certain users may employ exploits related to software and/or hardware of the client device 106 in order to gain root access or superuser privileges with respect to the client device 106. Accordingly, a compliance rule 119 specified by a network administrator may require that such a restriction or limitation on root access or superuser privileges remain in place with respect to a client device 106 in order for the client device 106 to access user data 117. The agent application 131 and/or mail proxy 133 can determine whether such a restriction or limitation has been removed by attempting to perform one or more actions for which root access or superuser privileges are required. If the agent application 131 and/or mail proxy 133 can perform the one or more actions, a determination can be made that the restriction or limitation has been removed.

A compliance rule 119 can specify that the client device 106 and/or other employ a certain encryption protocol or procedure. For example, a compliance rule 119 may specify that the client device 106 employ data at rest encryption for certain data stored on the client device 106. As another example, a compliance rule 119 may specify that a client device 106 and/or an application executed by the client device should periodically communicate with or "ping" the management console 116, remote mail server 115 and/or another application or service within a specified amount of time relative to a previous communication or ping. In other words, the compliance rule 119 can specify that the client device 106 periodically "check in" with the remote mail server 115, management console 116 or another server process.

Another compliance rule 119 may specify that the certain applications may not be installed on a client device 106 in order for the client device 106 to be permitted to access user data 117. For example, certain applications may be identified as malicious applications or unauthorized applications. Accordingly, if such an application is detected to be installed on the client device 106, a compliance rule 119 may specify that such a client device 106 is not permitted to access user data 117 corresponding to a particular user account or that another action should be taken. Alternatively, a compliance rule 119 may also require that one or more applications be installed on the client device 106 in order for the client device 106 to be permitted to access user data 117. For example, certain applications may be identified as required applications by an administrator. Accordingly, if such an application is not detected to be installed on the client device 106, a compliance rule 119 may specify that such a client device 106 is not permitted to access user data 117 corresponding to a particular user account or that another action should be taken.

A compliance rule 119 may also specify that if certain types of data are detected to be resident on the client device 106 or in storage accessible to the client device 106, that a security command should be issued to the client device 106. For example, certain data may be identified as unauthorized data. Accordingly, if such data is detected to be stored on the client device 106, a compliance rule 119 may specify that such a client device 106 is not permitted to access user data 117 corresponding to a particular user account or that another action should be taken. Such unauthorized data can include, for example, music, videos, games, unencrypted data, secure documents, or any other data that can be detected as stored on the client device 106. A compliance rule 119 may specify that a certain action should be taken when the client device 106 it is detected that a new subscriber identity module (SIM) card is inserted into a client device 106 relative to a previous SIM card.

A compliance rule 119 may also specify parameters with respect to password complexity, and if a password corresponding to a user fails to possess a minimum password complexity, the management console 116 and/or a locally executed process can issue a security command to the client device 106. Another compliance rule 119 may relate to a maximum number of failed login and/or unlock code entry attempts, and if the agent application 131 and/or mail proxy 133 detects that this number of attempts has been exceeded, a security command can be communicated from the mail proxy 133 to an application executed by the client device 106 instructing the client device 106 to take a particular action.

As another example, a compliance rule 119 may specify that mailbox data 121, calendar data 123 and/or contact data 125 may not be copied and pasted to an application other than the mail client 129, and if such behavior is detected, a security command can be issued to the mail client 106.

A compliance rule 119 can also specify parameters with respect to multiple devices associated with a user account. For example, a compliance rule 119 may specify that the user may authorize a maximum number of devices to obtain user data 117 via the remote mail server 115, and if the user attempts to authorize more than the maximum number of devices, then a security command will be issued to one or more of the client devices 106 associated with the user account. As another example, a compliance rule 119 may specify that a security command be issued to the client device 106 if the client device 106 connects to an insecure and/or unencrypted network. A compliance rule 119 may also specify that should a particular application or functionality be launched and/or disabled by the client device 106 (e.g., a device camera, a global positioning system capability, etc.), a security command should be issued to the client device 106.

Additionally, certain compliance rules 119 may be enforced depending upon the location of the client device 106. For example, certain compliance rules 119 may be triggered when the location of the client device 106 is detected to be within or outside of a certain geographic area or when the client device 106 is connected to a particular network 109. In such a scenario, the agent application 131 and/or mail proxy 133 can issue a security command to the client device 106 when a compliance rule 119 is violated and when a particular property regarding the location of the client device 106 can be detected. A location property can be detected via a global positioning system or other location detection capability of the device and/or when the client device 106 is in a particular data roaming state.

Compliance with compliance rules 119 may be determined by a process executed by the client device 106, by the management console 116, by a combination of the management console 116 and a locally executed process, or by another process that is executed on another computing device. For example, the agent application 131 and/or mail proxy 133 can submit a request to the management console 116 requesting that the management console 116 determine whether the client device 106 is in compliance with compliance rules 119. The management console 116 can make such a determination and issue a response to the agent application 131 and/or mail proxy 133 indicating whether the client device 106 is in compliance. Additionally, compliance may be determined by a combination of the agent application 131, mail proxy 133 and/or the management console 116. For example, compliance with certain compliance rules 119 may be determined locally on the client device 106, while others may require or may be more efficiently determined by the management console 116.

As referenced above, compliance rules 119 can specify actions that should be taken in response to detecting an issue with respect to a client device 106 that is potentially violating a compliance rule 119. For example, a compliance rule 119 can specify that if a particular rule is violated, a security command be issued to the client device 106 specifying an action to be taken. As one example, such a security command can comprise a wipe command that instructs the client device 106 or an application executed by the client device 106 to remove data stored on the client device 106. Such a wipe command can specify that all user data 117 or that certain user data 117 be removed from the client device 106. As another example, the security command can inform an application executed by the client device 106 that a user account associated with the client device 106 discard data to provide an empty mailbox, an empty calendar and/or no contacts data. As yet another example, a security command can comprise a command that the client device 106 lock a display associated with the client device 106 such that a password and/or personal identification number (PIN) code be reentered via the client device 106 in order to access user data 117 stored on the client device 106.

The security command can also specify that any action taken with respect to a client device 106 in response to detecting violation of a compliance rule 119 may be reversed, if possible, if the client device 106 later becomes compliant with the compliance rule 119. For example, if a particular compliance rule 119 specified that a client device 106 periodically check in with the remote mail server 115, a security command can be issued specifying a certain action, such as locking the display of the client device 106, if the client device 106 has not checked in during a specified period of time. Should the client device 106 later check in with the remote mail server 115, an additional security command can be issued to the client device 106 releasing or altering a previously taken action. For example, the additional security command can release a display lock imposed by a previous security command.

In some embodiments, the security command may comprise a warning or alert that is displayed or transmitted to the user. For example, a warning message indicating that one or more client devices 106 of the user are out of compliance can be transmitted to the client devices 106 of the user as a push notification, an email message, a text message or any other form of communication. Such a warning can comprise a visual indicator that is rendered by the agent application 131, mail proxy 133 and/or other application executed by the client device 106. Such a warning may also communicate to the user of an action that may be taken with respect to client devices 106 associated with the user should the violated compliance rule 119 not be remediated within a specified period of time.

A compliance rule 119 may also specify that should one or more client devices 106 associated with a user be out of compliance, that a particular action be taken with respect to other client devices 106 associated with the user account even if the other client devices 106 are not specifically out of compliance with a compliance rule 119. For example, if a particular client device 106 violates a particular compliance rule 119, the compliance rule 119 may specify that all data from all of the client devices 106 associated with the user be erased. Accordingly, in such a scenario, the management console 116 and/or remote mail server 115 can facilitate issuing such a security command to other client devices 106 associated with the user.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 106 may include a display that comprises, for example, one or more devices such as liquid crystal display (LCD) displays, gas plasma-based flat panel displays, organic light emitting diode (OLED) displays, LCD projectors or other types of display devices.

The client device 106 may be configured to execute various applications, such as a mail client 129. The mail client 129 may be executed to facilitate access to user data 117 of a user, such as mailbox data 121, calendar data 123 and/or contact data 125. To this end, the mail client 129 is configured with a network address of a mail server with which to communicate in order to retrieve and/or synchronize mailbox data 121, calendar data 123 and/or contact data 125. The mail client 129 is also configured with a username, password, an authentication certificate, or other authentication credentials with which the mail client 129 can be authenticated in order to access user data 117 associated with the user.

The client device 106 is also configured to execute an agent application 131. The agent application 131 can be executed by the client device 106 upon startup of the client device 106. The agent application 131 can also be executed as a background process by the client device 106. The agent application 131 can be installed by a user and/or systems administrator and facilitate access to user data 117 by a user of the client device 106. For example, the agent application 131 can be executed by a user to facilitate provisioning of a device and/or configuration of a mail client 129 for access to user data 117 and/or other enterprise resources. As will be described in further detail herein, the agent application 131 can also execute a mail proxy 133 on the client device 106 with which the mail client 129 can communicate in order to access and/or synchronize user data 117 from the data store 113. In this sense, the mail proxy 133 executed by the agent application 131 on the client device 106 can act as a proxy server for access by the mail client 129 to the remote mail server 115.

The client device 106 is further associated with a device identifier 135. The device identifier 135 can be associated with a hardware component of the client device 106. In other words, the device identifier 135 can be stored on a chip, memory device, or other hardware component of the client device 106. For example, the device identifier 135 may be a unique hardware identifier such as a media access control (MAC) address, a central processing unit (CPU) identifier, and/or other hardware identifiers. The device identifier 135 may also be stored in a memory of the client device 106 and comprise a software generated identifier that uniquely identifies the client device 106.

Client user data 137 can represent data that is stored in user space on the client device 106. Client user data 137 can include data such as locally stored or cached mailbox data 121, calendar data 123 and/or contact data 125 that is accessed by the mail client 129 as well as other files, media, applications and/or documents that are stored by the user and/or an application executed by the client device 106. The client device 106 may be configured to execute applications beyond those that are identified above, such as, for example, browsers, mobile applications, other email applications, social networking applications, and/or other applications.

Compliance rules 139 can also be stored on a client device 106. As described above, compliance rules 119 can specify various requirements or rules that should be followed in order for a user to access user data 117 via the client device 106. Accordingly, the agent application 131 can obtain compliance rules 119 from the remote mail server 115 and store them as compliance rules 139 on the client device 106. As such, in some embodiments, the agent application 131 and/or mail proxy 133 can enforce the compliance rules 139 on the client device 106 on behalf of the remote mail server 115.

Next, a general description of the operation of the various components of the networked environment 100 is provided. To begin, the agent application 131 can facilitate provisioning of the client device 106. In other words, the agent application 131 can facilitate configuration of the mail client 129 with a user's authentication credentials as well as a network address of a mail server with which the mail client 129 should be configured to access mailbox data 121, calendar data 123 contact data 125 and/or other data to which access is facilitated by the computing environment 103, which is also referred to herein as enterprise data. The agent application 131 can also configure the mail client 129 with a device identifier 135 of the client device 106.

As noted above, the agent application 131 can also facilitate execution of a mail proxy 133 on the client device. Additionally, the agent application 131 can configure the mail client 129 to point to a network address corresponding to the locally executed mail proxy 133 as a server through which synchronization of enterprise data is facilitated. In other words, the mail client 129 is configured to employ as its synchronization server a network address on which the mail proxy 133 executed by the client device 106 is listening and not a network address that is external to the client device 106 and on which the remote mail server 115 is listening. Stated another way, the mail proxy 133 can be configured to execute as a server process that listens to requests submitted to "localhost" or a local internet protocol address on a particular port and that the mail client 129 is configured to submit requests to enterprise data to local on the particular port. The mail proxy 133 can also be configured to accept only requests received from the mail client 129 and/or applications executed by the client device 106 and not requests that originate external to the client device 106 other than communications received from the remote mail server 115.

In some embodiments, configuration of the mail client 129 in this way can be manually performed by a user and/or systems administrator. It should be appreciated that automatic configuration of the mail client 129 by the agent application 131 to employ the mail proxy 133 as its synchronization server is but one example. Functionality of the agent application 131 and/or mail proxy 133 discussed herein can also be implemented in a single process or application as well as in multiple processes or applications executed by the client device 106.

Upon receiving a request to send, receive and/or synchronize enterprise data from the mail client 129 or any other application executed by the client device 106, the mail proxy 133 can determine a user account associated with the request and then request that the agent application 131 determine whether the client device 106 complies with compliance rules 139 that are associated with access to enterprise data associated with the user account. If the client device 106 complies with the compliance rules 139 as determined by the agent application 131, the mail proxy 133 can forward the request to the remote mail server 115. Upon servicing of the request, the remote mail server 115 can issue a response to the mail proxy 133, which can forward the response to the mail client 129. In this way, the mail proxy 133 executed by the client device 106 is acting as a proxy server on behalf of the remote mail server 115.

If the client device 106 does not comply with one or more compliance rules 139 as determined by the agent application 131, the mail proxy 133 can issue a security command to the mail client 129 as specified by the compliance rules 139 that are stored locally on the client device 106. The mail proxy 133 can also generate and send a communication to the remote mail server 115 informing the remote mail server 115 of the compliance failure of the client device 106. Such a communication can include the device identifier 135 of the client device 106 so that the remote mail server 115 can enforce the compliance rules 119 that have been violated with respect to other devices associated with the user account.

Accordingly, as one example of the mail proxy 133 facilitating enforcement of compliance rules 139, if the client device 106 has had a limitation of a hardware component or software component removed, the mail proxy 133 can issue a wipe command to the mail client 129 that instructs the mail client 129 to remove or erase client user data 137 that is stored on the client device 106. Stated another way, if the client device 106 has been "rooted" or "jailbroken" such that root access or superuser privileges have been granted to a user account of the client device 106 by circumventing or overcoming a software or hardware limitation imposed by the device maker or operating system vendor in violation of policies in place regarding access to enterprise resources, the mail proxy 133 can issue a security command to the mail client 129 instructing the mail client 129 to wipe client user data 137 and/or enterprise data from the client device 106.

A wipe command can comprise a command that is supported by a data synchronization protocol implemented by the mail client 129 and mail proxy 133 that instructs the mail client 129 to erase certain data from the client device 106. As noted above, a wipe command can instruct the mail client 129 to erase mailbox data 121, calendar data 123, and/or contact data 125 from client user data 137. In some embodiments, the wipe command can instruct the mail client 129 to initiate removal or erasure of other client user data 137 as well, such as documents, media, settings, preferences, applications, and/ or any other data stored by the user or applications installed by the user on the client device 106. In some embodiments, the wipe command can comprise a communication issued by the mail proxy 133 to the mail client 129 informing the mail client 129 that for a given user account associated with the wipe command, there exists an empty mailbox, calendar, and/or address book.

A security command issued by the mail proxy 133 can also take other forms. As one example, if the client device 106 is in violation of a compliance rule 139, the mail proxy 133 can instruct the mail client 129 or any other process or application executed by the client device 106 to lock a display associated with the client device 106 and require the user to re-authenticate by reentering a personal identification number (PIN) and/or a password in order to access resources that are stored on the client device 106. A security command issued by the mail proxy 133 can also instruct the mail client 129 to remove only client user data 137 that is associated with enterprise data for the user account that is synchronized via the remote mail server 115.

By determining compliance with compliance rules 139 that are stored on the client device 106 and issuing a security command via the mail proxy 133 that is also executed on the client device 106, embodiments of the instant disclosure can enforce compliance rules 139 concerning access to user data 117 even if network 109 access of the client device 106 is impaired or disabled. In other words, while other solutions may rely upon issuance of a security command from the remote mail server 115, embodiments of the instant disclosure, by employing the mail proxy 133 as a proxy for communications between the mail client 129 and the remote mail server 115, can issue a security command such as a wipe command to the mail client 129 by detecting locally compliance with compliance rules 139 on the client device 106 and issuing security commands from the locally executed mail proxy 133.

Figure 2A:
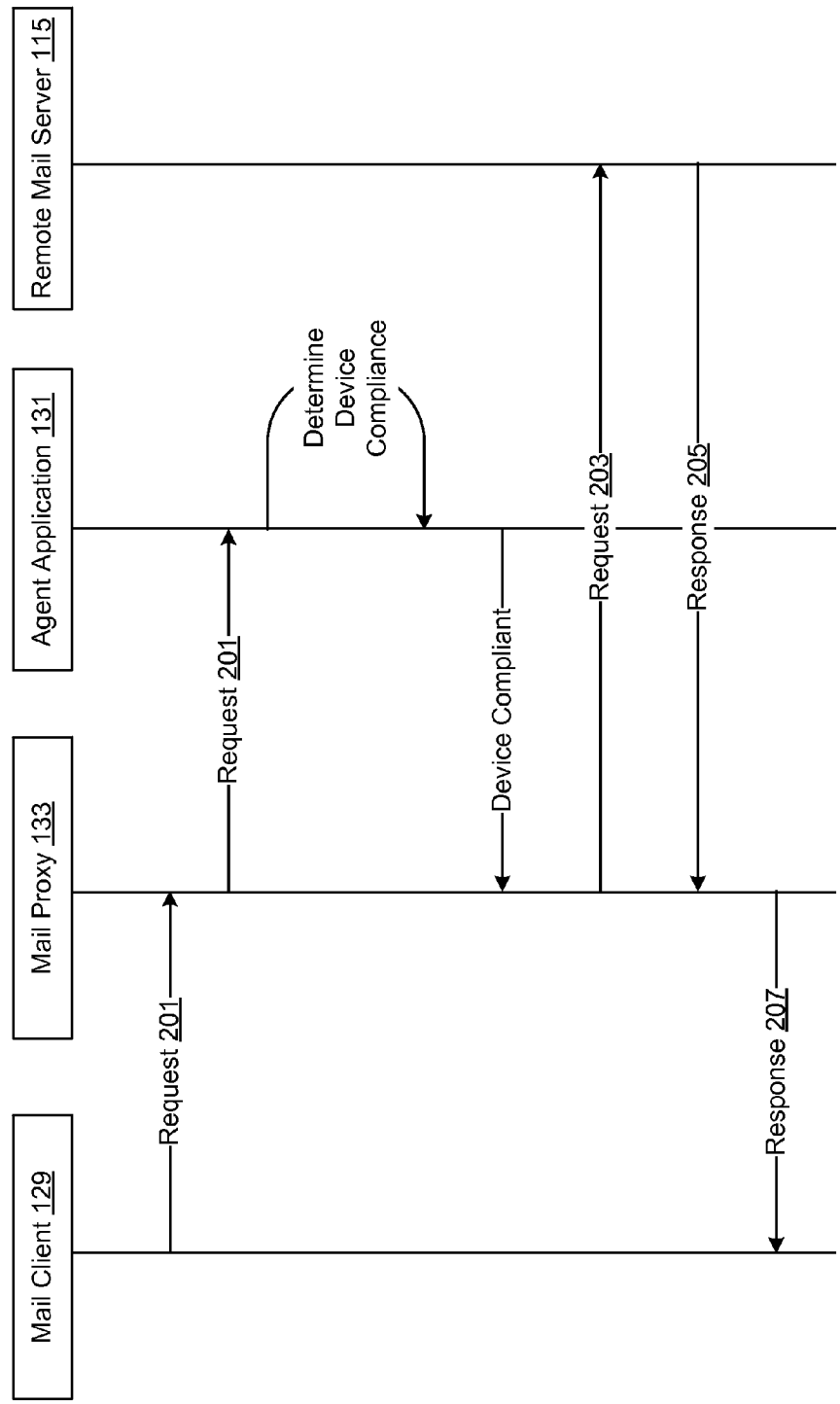
FIG. 2A is a sequence diagram illustrating operation of a client device and/or computing environment in the networked environment of FIG. 1 according to various embodiments of the present disclosure.

Referring next to FIG. 2A, shown is an example sequence diagram that illustrates one example of interactions between the various components illustrated in the example networked environment 100 of FIG. 1. FIG. 2A illustrates an example of a client device 106 that is determined to be in compliance with compliance rules 119, 139. As shown in FIG. 2A, the mail client 129 executed by the client device 106 communicates a request 201 for data associated with mailbox data 121, calendar data 123 and/or contact data 125 to the mail proxy 133. Such a request 201 can comprise a request to send, receive and/or synchronize enterprise data via the remote mail server 115. The mail proxy 133 and/or agent application 131 can be executed as background processes on the client device 106. As noted above, the mail client 129 is configured to communicate requests to send and/or receive data associated with a particular user account to the mail proxy 133, which acts as a proxy on behalf of the remote mail server 115.

The request 201 can be forwarded along to the agent application 131, which can then determine whether the client device 106 is in compliance with compliance rules 139 stored on the client device 106. As noted above, the compliance rules 139 can be obtained by the agent application 131 from the remote mail server 115 and stored on the client device 106. If the agent application 131 determines that the client device 106 complies with the compliance rules 139 stored on the client device 106, then the agent application 131 can inform the mail proxy 133 of the compliance of the client device 106.

Next, the mail proxy 133 can either forward the request 201 to the remote mail server 115 or transform the request 201 into a request 203 that is transmitted to the remote mail server 115. For example, the request 201 obtained from the mail proxy 133 may be transformed into a new request 203 with addressing information and/or authentication information that is specific to the remote mail server 115. The remote mail server 115 can issue a response 205 to the mail proxy 133, which can either forward the response 205 to the mail client 129 or transform the response 205 into a response 207 that is transmitted to the mail client 129.

Figure 2B:
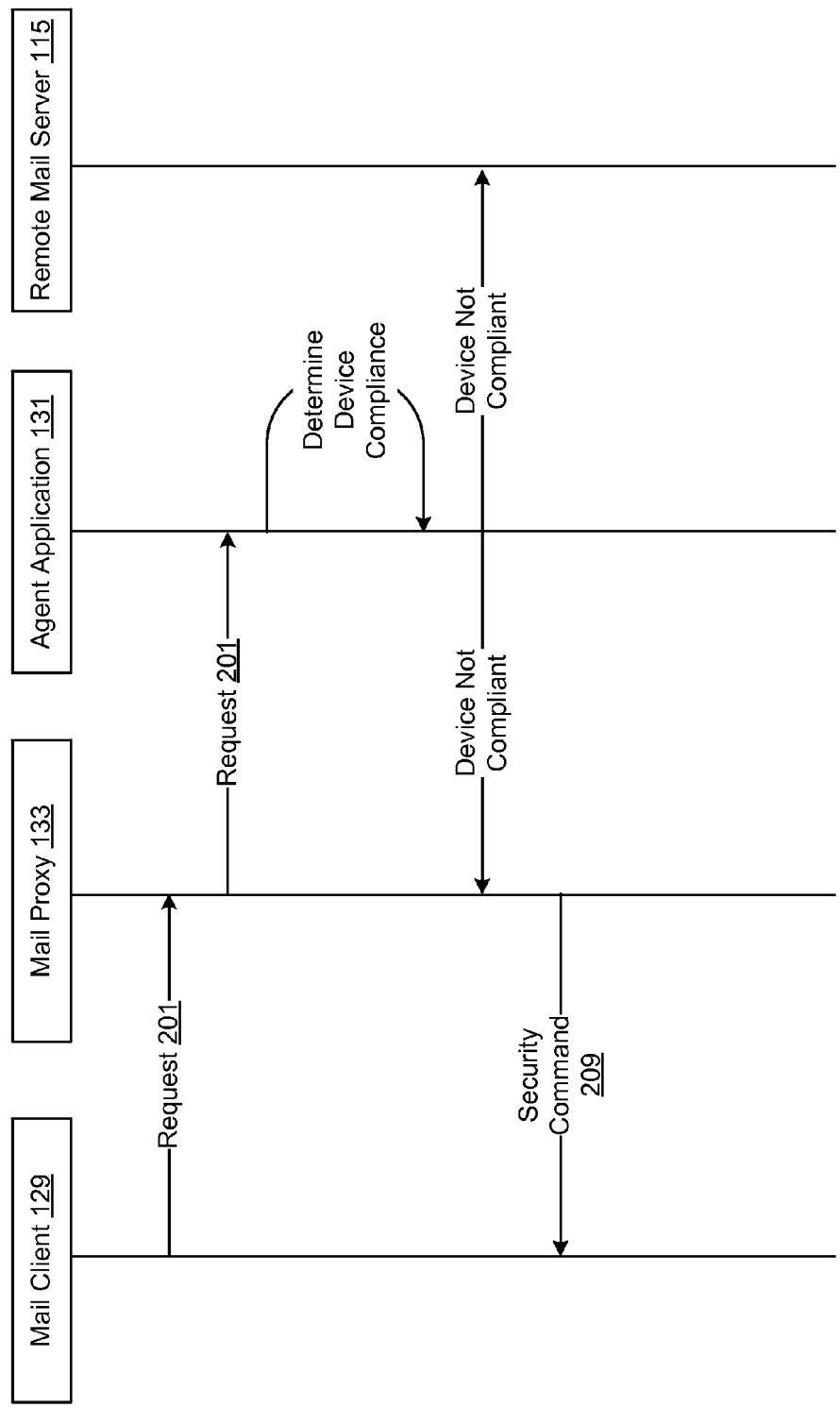
FIG. 2B is a sequence diagram illustrating operation of a client device and/or computing environment in the networked environment of FIG. 1 according to various embodiments of the present disclosure.

Referring next to FIG. 2B, shown is an example sequence diagram that illustrates one example of interactions between the various components illustrated in the example networked environment 100 of FIG. 1. FIG. 2B illustrates an example of a client device 106 that is determined to be not in compliance with compliance rules 119, 139. As shown in FIG. 2B, the mail client 129 executed by the client device 106 communicates a request 201 for data associated with mailbox data 121, calendar data 123 and/or contact data 125 to the mail proxy 133. The request 201 can be forwarded along to the agent application 131, which can then determine whether the client device 106 is in compliance with compliance rules 139 stored on the client device 106.

If the agent application 131 determines that the client device 106 fails to comply with one or more compliance rules 139 stored on the client device 106, then the agent application 131 can inform the mail proxy 133 of the lack of compliance of the client device 106. The agent application 131 can also inform the mail proxy 133 of a particular action to be taken in response to the compliance failure. In other words, the agent application 131 can inform the mail proxy 133 whether to issue a wipe command, a command to require user re-authentication, etc. The agent application 131 can also report the non-compliance of the client device 106 to the remote mail server 115. In some embodiments, non-compliance can also be reported to the management console 116. Next, the mail proxy 133 can issue an appropriate security command 209 as specified by the agent application 131 and/or the compliance rule 139 that is violated to the mail client 129. In some embodiments, the management console 116 can issue security commands to the client device 106 or other client devices 106 associated with the particular user with whom the violation of a compliance rule 119 is detected.

Figure 3:
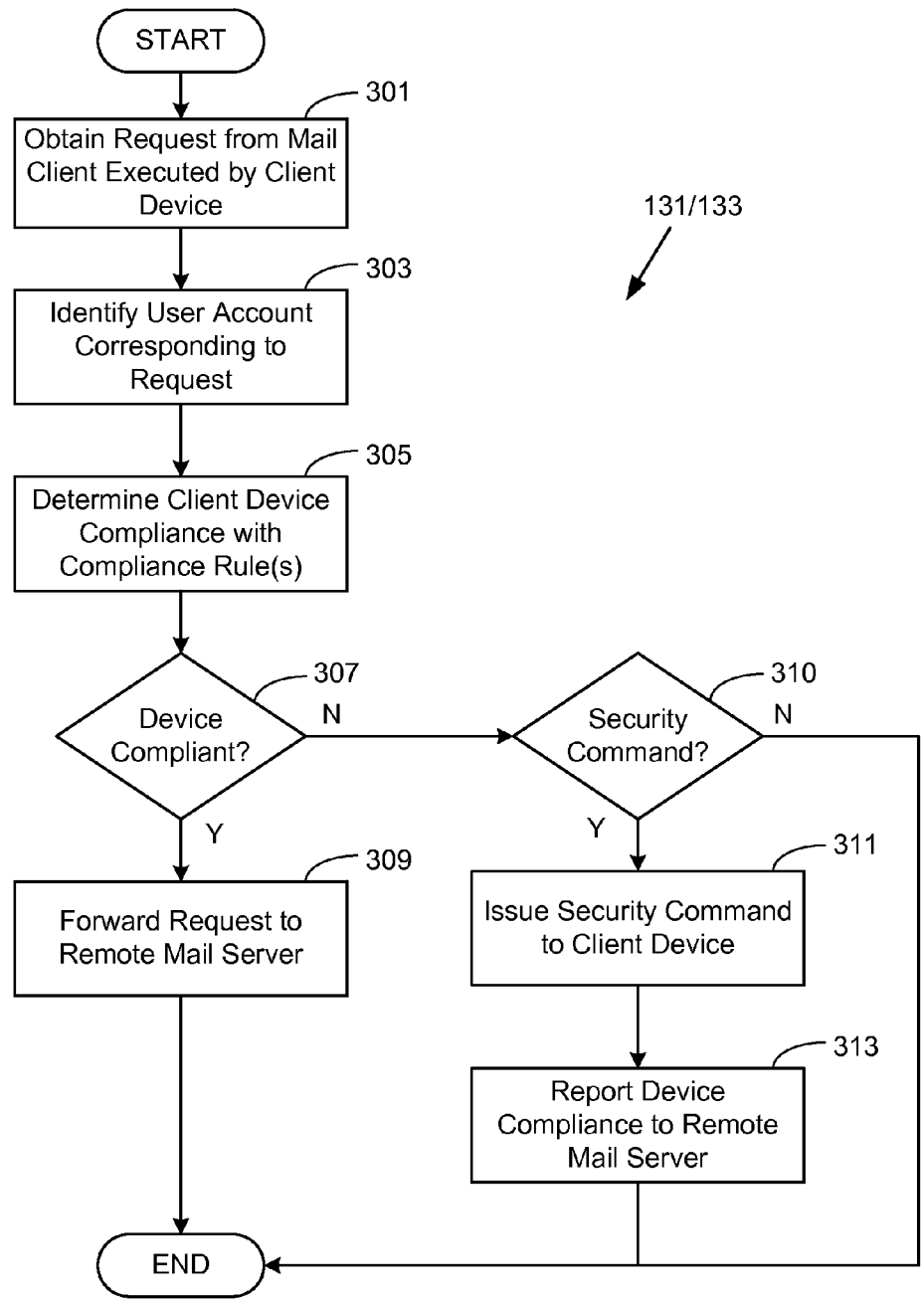
FIG. 3 is a flowchart illustrating one example of functionality implemented as portions of agent application executed in a computing environment in the networked environment of FIG. 1 according to various embodiments of the present disclosure.

Referring next to FIG. 3, shown is a flowchart that provides one example of the operation of a portion of the agent application 131 and/or mail proxy 133 according to various embodiments. It is understood that the flowchart of FIG. 3 provides merely an example of the many different types of functional arrangements that may be employed to implement the operation of the portion of the agent application 131 and/or mail proxy 133 as described herein. As an alternative, the flowchart of FIG. 3 may be viewed as depicting an example of elements of a method implemented in the client device 106 (FIG. 1) according to one or more embodiments. As noted above, functionality attributed to either the mail proxy 133 and/or the agent application 131 can be implemented in a single process or application executed by the client device 106 and/or multiple processes or applications. The separation or segmentation of functionality as discussed herein is presented for illustrative purposes only.

Beginning with box 301, the mail proxy 133 obtains a request to send, receive and/or synchronize data associated with enterprise data stored in the data store 113 from a mail client 129 executed by the client device 106. Such a request can be a request to obtain mailbox data 121, calendar data 123, and/or contact data 125 associated with a particular user account. Such a request can also comprise a request to send a mail message, to send an appointment invitation, or a request to update any enterprise data stored on the device as well as in the data store 113.

Next, in box 303, the agent application 131 and/or mail proxy 133 can identify a user account associated with the request received from the mail client 129 executed by the client device 106. In some embodiments, the agent application 131 and/or mail proxy 133 need not determine a user account associated with the request. Next, at box 305, the agent application 131 can determine whether the client device 106 is in compliance with compliance rules 139 that are stored on the client device 106. As noted above, compliance rules 139 can specify rules with which the client device 106 and/or user of a client device 106 must comply in order to access user data 117 stored on the data store 113. At box 307, if the agent application 131 determines that the client device 106 is in compliance with compliance rules 139 stored on the client device 106, the agent application 131 can allow the mail proxy 133 to forward the request to the remote mail server 115 in box 309. In this way, the mail proxy 133 acts as a proxy server on behalf of the remote mail server 115 when the client device 106 is in compliance with compliance rules 139.

If the agent application 131 determines that the client device 106 is not in compliance with compliance rules 139 stored on the client device 106, at box 310, the agent application 131 and/or mail proxy 133 can determine whether a security command should be issued to the client device 106 depending upon the particular action specified by the compliance rule 119 that should be taken in response to the violation of the compliance rule 119. If the compliance rule 119 specifies that a particular security command should be issued to the client device 106, the mail proxy 133 can issue a security command to the mail client 129 executed by the client device 106 at box 311 as well as report the lack of compliance of the client device 106 to the remote mail server 115 and/or management console 116 at box 313. In some embodiments, the security command can be specific to the user account associated with the user data 117 stored on the client device 106. Thereafter, the process shown in FIG. 3 ends.

Figure 4:
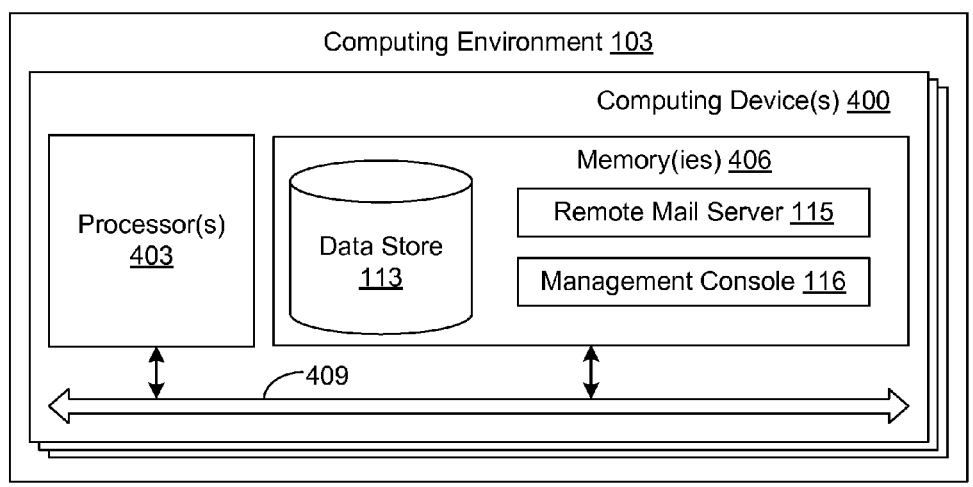
FIG. 4 is a schematic block diagram that provides one example illustration of a computing environment employed in the networked environment of FIG. 1 according to various embodiments of the present disclosure.
Figure 5:
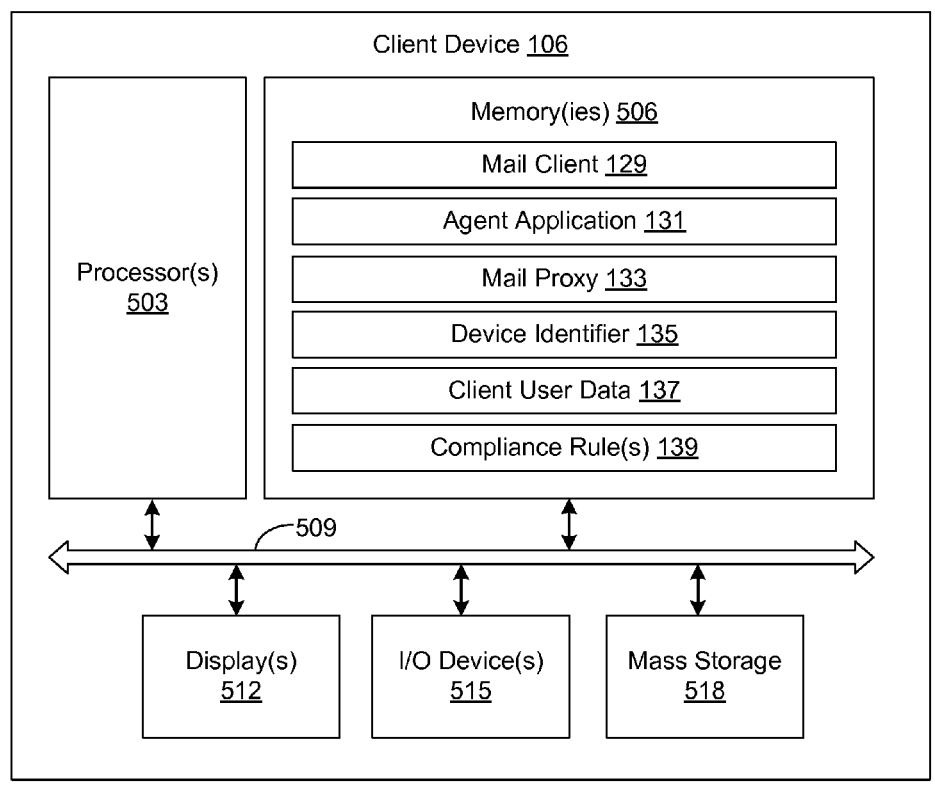
FIG. 5 is a schematic block diagram that provides one example illustration of a client device employed in the networked environment of FIG. 1 according to various embodiments of the present disclosure.

With reference to FIGS. 4-5, shown is a schematic block diagram of the computing environment 103 and client device 106 according to an embodiment of the present disclosure. The computing environment 103 includes one or more computing devices 400. Each computing device 400 and/or client device 106 includes at least one processor circuit, for example, having a processor 403, 503 and a memory 406, 506, both of which are coupled to a local interface 409, 509, respectively. As such, each computing device 400 may comprise, for example, at least one server computer or like device. A client device 106 may comprise a mobile device, smartphone, computing device or like device. The local interface 409, 509 may comprise, for example, a data bus with an accompanying address/control bus or other bus structure as can be appreciated.

Stored in the memory 406, 506 are both data and several components that are executable by the processor 403, 503. In particular, stored in the memory 406 and executable by the processor 403 are the remote mail server 115, and potentially other applications. Also stored in the memory 406 may be a data store 113 and other data. In addition, an operating system may be stored in the memory 406 and executable by the processor 403. Stored in the memory 506 and executable by the processor 503 are the agent application 131, mail proxy 133, and potentially other applications.

It is understood that there may be other applications that are stored in the memory 406, 506 and are executable by the processor 403, 503 as can be appreciated. Where any component discussed herein is implemented in the form of software, any one of a number of programming languages may be employed such as, for example, C, C++, C#, Objective C, Java®, JavaScript, Perl, PHP, Visual Basic®, Python®, Ruby, Flash®, or other programming languages.

A number of software components are stored in the memory 406, 506 and are executable by the processor 403, 503. In this respect, the term "executable" means a program file that is in a form that can ultimately be run by the processor 403, 503. Examples of executable programs may be, for example, a compiled program that can be translated into machine code in a format that can be loaded into a random access portion of the memory 406, 506 and run by the processor 403, 503, source code that may be expressed in proper format such as object code that is capable of being loaded into a random access portion of the memory 406, 506 and executed by the processor 403, 503, or source code that may be interpreted by another executable program to generate instructions in a random access portion of the memory 406, 506 to be executed by the processor 403, 503, etc. An executable program may be stored in any portion or component of the memory 406, 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406, 506 is defined herein as including both volatile and nonvolatile memory and data storage components. Volatile components are those that do not retain data values upon loss of power. Nonvolatile components are those that retain data upon a loss of power. Thus, the memory 406, 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403, 503 may represent multiple processors 403, 503 and/or multiple processor cores and the memory 406, 506 may represent multiple memories 406, 506 that operate in parallel processing circuits, respectively. In such a case, the local interface 409, 509 may be an appropriate network that facilitates communication between any two of the multiple processors 403, 503, between any processor 403, 503 and any of the memories 406, 506, or between any two of the memories 406, 506, etc. The local interface 409, 509 may comprise additional systems designed to coordinate this communication, including, for example, performing load balancing. The processor 403, 503 may be of electrical or of some other available construction.

The client device 106 may include a display 512 that comprises, for example, one or more devices such as liquid crystal display (LCD) displays, gas plasma-based flat panel displays, organic light emitting diode (OLED) displays, LCD projectors, or other types of display devices, etc. The client device 106 may also include one or more input/output devices 515 that may include, for example, a capacitive touchscreen or other type of touch input device, fingerprint reader, keyboard, etc. Additionally, the client device 106 may also include some form of mass storage 518, which can comprise a hard drive, flash memory, or other storage devices.

Although the remote mail server 115, agent application 131, mail proxy 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The FIG. 3 shows an example of the functionality and operation of an implementation of portions of the agent application 131 and/or mail proxy 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the agent application 131 and/or mail proxy 133, that comprises software or code can be embodied in any non-transitory computer-readable medium for use by or in connection with an instruction execution system such as, for example, a processor 403, 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the mail proxy 133 and/or agent application 131, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400 and/or client device 106, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a client device, the program, when executed by the client device, being configured to cause the client device to at least:

receive a request to communicate with a mail server, the request originating from a mail client executed by the client device, wherein the mail client is configured to transmit requests associated with a mail account to the mail server, the mail server corresponding to a network address of the client device and the mail server further corresponding to a mail proxy executed by the client device;

determine, in response to receiving the request, whether a limitation on at least one component of the client device has been removed;

in response to determining that the limitation on at least one component of the client device has not been removed, forwarding the request to communicate with the mail server to a remote mail server accessible through a network, the remote mail server corresponding to a network address external to the client device and the remote mail server further corresponding to a remote mail server executed by another computing device, wherein a response to the request to communicate with the mail server is received from the remote mail server and forwarded to the mail client; and in response to determining that the limitation on at least one component of the client device has been removed, issuing a command from the mail proxy executed by the client device to the mail client executed by the client device to remove data from the client device.

2. The non-transitory computer-readable medium of claim 1, wherein the command instructs the mail client to erase data stored on the client device.

3. The non-transitory computer-readable medium of claim 2, wherein the data comprises at least one of: mail data, calendar data or contact data that is accessible to the mail client.

4. The non-transitory computer-readable medium of claim 1, wherein the program determines whether the limitation of the at least one component of the client device has been removed by determining whether root access to resources of the client device have been granted to a user of the client device.

5. The non-transitory computer-readable medium of claim 1, wherein the program determines whether the limitation of the at least one of component of the client device has been removed by determining whether at least one of: a subscriber identity module (SIM) card has been removed from the client device or a new SIM card that differs from a previous SIM card has been installed in the client device.

6. The non-transitory computer-readable medium of claim 1, wherein the program is configured to issue the command from a server process executed by the client device to the mail client executed by the client device to remove data from the client device when external network accessibility of the client device is impaired or disabled.

7. A system, comprising:
a client device;
programming code executable in the client device, the programming code comprising:
logic that receives a communication from an application executed by the client device, the application being configured to identify a network address corresponding to the client device as a server corresponding to the communication;
logic that determines whether the client device complies with at least one compliance rule in response to receiving the communication from the application executed by the client device;
logic that forwards the communication to another server external to the client device in response to determining that the client device complies with the at least one compliance rule; and
logic that issues a security command to the client device in response to determining that the client device violates the at least one compliance rule.

8. The system of claim 7, wherein the logic that determines whether the client device complies with the at least one compliance rule further comprises:
logic that sends a request to another computing device accessible through a network; and
logic that obtains a response to the request from the another computing device indicating whether the client device complies with the at least one compliance rule.

9. The system of claim 7, wherein the logic that determines whether the client device complies with the at least one compliance rule further comprises:
logic that sends a request to another application executed by the client device; and
logic that obtains a response to the request from the application executed by the client device indicating whether the client device complies with the at least one compliance rule.

10. The system of claim 7, wherein the security command further comprises a warning that the client device violates the at least one compliance rule, the warning comprising at least one of a visual alert displayed by the client device or a message transmitted to a user corresponding to the client device.

11. The system of claim 7, wherein the security command further comprises a wipe command instructing the application to delete data accessible to the client device.

12. The system of claim 11, wherein the wipe command instructs a mail client to delete at least one of: mail data, calendar data, contact data, or user data associated with the client device.

13. The system of claim 7, wherein the application executed by the client device further comprises a mail client.

14. The system of claim 13, wherein the security command further comprises a communication indicating that a mail account associated with the mail client has at least one of: an empty mailbox, an empty calendar or an empty address book.

15. The system of claim 7, wherein the security command further comprises a command to lock a display associated with the client device.

16. The system of claim 7, wherein the at least one compliance rule is at least one of: a requirement that an operating system of the client device be in an unaltered state or a requirement that a user account associated with the client device not have root privileges.

17. The system of claim 7, wherein the at least one compliance rule comprises a requirement that the client device be located within a geographic boundary, wherein a location of the client device is obtained from a positioning system associated with the client device.

18. The system of claim 7, wherein the at least one compliance rule comprises a requirement that at least one specified application not be installed on the client device.

19. The system of claim 7, wherein the at least one compliance rule comprises a requirement that at least one specified application be installed on the client device.

20. A method, comprising:
obtaining, within a client device, a request associated with a mail account from a mail client executed by the client device, the request submitted to a mail proxy executed by the client device;
determining, by the client device, whether the client device complies with a compliance rule associated with the mail account; and
issuing, from the client device, a security command in response to determining that the client device fails to comply with the compliance rule, the security command communicated from the mail proxy executed by the client device to the mail client executed by the client device.

21. The method of claim 20, wherein the security command further comprises a wipe command instructing the mail client to delete data stored on the client device.

22. The method of claim 20, further comprising forwarding, from the client device, the request to a remote mail server executed on another computing device external to the client device in response to the client device complying with the compliance rule.

23. The method of claim 22, further comprising:
obtaining, within the client device, data associated with the mail account from the remote mail server executed on the other computing device external to the client device; and
forwarding, from the client device, the data associated with the mail account from the mail proxy executed by the client device to the mail client executed by the client device.

24. The method of claim 22, wherein the mail client is configured to identify a network address associated with the mail proxy executed by the client device as a mail server associated with the mail account but not another network address corresponding to the remote mail server executed by the other computing device.

* * * * *